United States Patent [19]

Steinhauser et al.

[11] Patent Number: 5,031,972
[45] Date of Patent: Jul. 16, 1991

[54] PRESSURE GENERATOR FOR A HYDRAULIC BRAKE SYSTEM FOR A VEHICLE

[75] Inventors: Walter Steinhauser, Schwieberdingen; Guenter Kaes, Stuttgart; Wolfgang Maisch, Schwieberdingen, all of Fed. Rep. of Germany; Alwin Stegmaier, North Charleston, S.C.

[73] Assignee: Robert Bosch GmbH, Stuttgart, Fed. Rep. of Germany

[21] Appl. No.: 548,407

[22] Filed: Jul. 5, 1990

[30] Foreign Application Priority Data

Aug. 25, 1989 [DE] Fed. Rep. of Germany ........ 3928110

[51] Int. Cl.$^5$ .............................................. B60T 8/62
[52] U.S. Cl. .................................. 303/116; 74/89.17; 303/100; 303/1
[58] Field of Search ............... 303/100, 113, 115, 116; 74/89.17

[56] References Cited

U.S. PATENT DOCUMENTS 4,715,724 12/1987 Ter Boek et al. ............. 74/89.17 X
4,893,882 1/1990 Leiber et al. ................... 303/116 X
4,950,028 8/1990 Harrison ......................... 303/116 X

FOREIGN PATENT DOCUMENTS 3236366 4/1984 Fed. Rep. of Germany.

Primary Examiner—Robert J. Oberleitner
Assistant Examiner—Lee W. Young
Attorney, Agent, or Firm—Edwin E. Greigg; Ronald E. Greigg

[57] ABSTRACT

A brake system including a traction control apparatus having at least one pressure generator 35, which has a cylinder 60 for receiving and expelling brake fluid by means of a piston 60. The cylinder 60 is connected, with a valve 72 actuatable as a function of the motion of the piston 50, to a pressure course between the master brake cylinder and a wheel brake cylinder. To attain a short structural length, on the one hand, and a long stroke of the pressure generator on the other, the piston is embodied as a rod piston; it is connected to a coaxially extending hollow cylinder 40 that envelops the piston 50 in the cylinder 60; the hollow cylinder 40 is longitudinally guided and is provided with a racklike set of teeth 41 on its outside for the engagement of a motor drive mechanism 43 for driving the piston relative to the cylinder.

7 Claims, 2 Drawing Sheets

PRESSURE GENERATOR FOR A HYDRAULIC BRAKE SYSTEM FOR A VEHICLE

BACKGROUND OF THE INVENTION

The invention is based on a pressure generator as defined hereinafter. Such a pressure generator is already known from German Offenlegungsschrift 32 36 366, in which a cylinder, of relatively large diameter, receives a piston which is longitudinally guided in the cylinder and provided with a restoring spring, an actuation member and a closing compression spring. A relatively large electromagnet is provided as an adjusting device for the piston and is coaxial with the cylinder; with a tappet, its movable armature is capable of engaging the piston to expel the brake fluid to the wheel brake cylinder. The return of the brake fluid, contrarily, is effected by the action of the restoring spring upon the piston.

Because of this embodiment of the pressure generator, high armature forces are necessary with a short piston stroke, to enable a sufficiently high braking force to be achieved for traction control. Furthermore the pressure generator has a relatively long structural length because of the coaxial in-line disposition of the cylinder and electromagnet.

OBJECT AND SUMMARY OF THE INVENTION

The pressure generator according to the invention has an advantage over the prior art of a short structural length of the pressure generator, on the one hand, because of a hollow cylinder that grips the outside of the rod piston and is connected to a rotary drive mechanism; on the other hand, a long stroke is attainable, with which the brake pressure in the wheel brake cylinder can be metered precisely. Moreover, with a small piston diameter and a long piston stroke, relatively low adjusting forces at the piston are needed to achieve the necessary braking work for braking a vehicle wheel exhibiting excessively high slip.

A provision set forth herein has an advantage that errors in alignment and angle between the cylinder and the piston, the fastening points of which are located relatively far apart, can be compensated for.

Further, a simple mounting connection, suitable for the load, between the piston and the hollow cylinder is disclosed. A further provision provides a suitable way to actuate a valve in which the end of the valve and the piston are located far apart because of a long piston stroke and further means does not affect the diameter of the piston cooperating with the actuating member.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
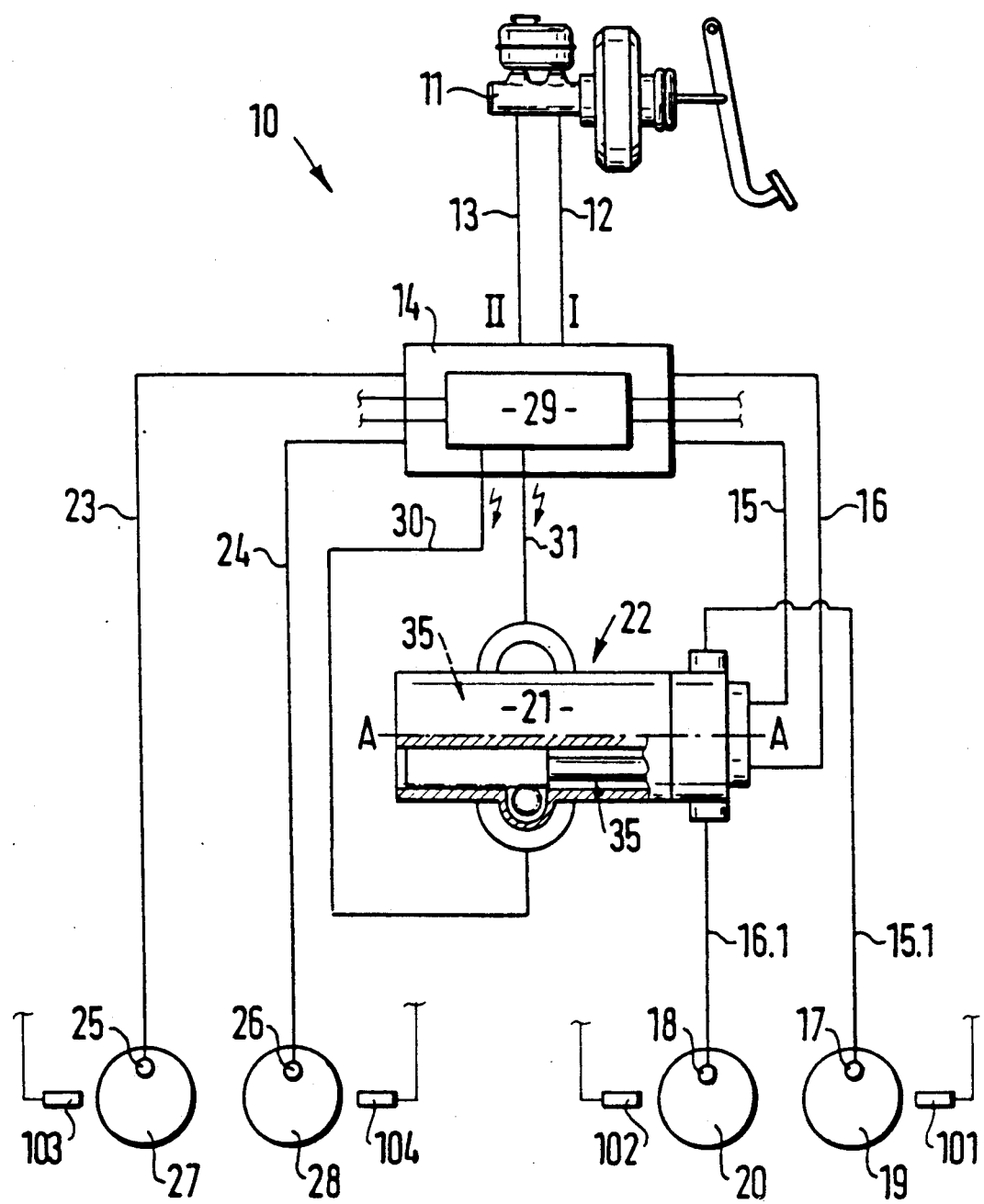
FIG. 1 schematically shows a hydraulic vehicle brake system having a pressure generator unit.

The layout of a hydraulic vehicle brake system 10 shown in FIG. 1 has a pedal-actuated master brake cylinder 11 for generating brake pressure. Connected to the master brake cylinder 11 are a master brake line 12 for a brake circuit I and a master brake line 13 for a brake circuit II. The master brake lines 12 and 13 discharge into a hydraulic control unit 14 of an anti-skid apparatus. In the brake circuit I, wheel brake lines 15, 15.1 and 16, 16.1, respectively, lead from the hydraulic control unit 14 to wheel brake cylinders 17 and 18 of the wheel brakes 19 and 20 of driven wheels of a first vehicle axle. One pressure generator unit 21 of a control apparatus 22 for limiting wheel drive slip, i.e., controlling traction, of one each of the wheels of the first vehicle axle is located between the respective wheel brake lines 15 and 15.1 and 16 and 16.1. The pressure generator unit 21 is described in greater detail hereinafter. In the brake circuit II, wheel brake lines 23 and 24 are connected to the hydraulic control unit 14. The wheel brake lines 23 and 24 lead to wheel brake cylinders 25 and 26 of the wheel brakes 27 and 28 of non-driven wheels of a second vehicle axis. An electronic control unit 29 receives signals from wheel sensors 101, 102, 103 and 104, for monitoring wheel rotation and triggering the hydraulic unit 14 for anti-skid operation or triggering the pressure generator unit 21 for traction control is also provided. Well known solenoids and a return pump, not shown in detail, are also incorporated in the hydraulic unit 14, so that in the event of the danger of locking of at least one wheel, the brake pressure in the appropriate wheel brake cylinder can be lowered, maintained or raised. If wheel slip of at least one of the driven wheels arises, the control unit 29, via lines 30 and 31, switches the pressure generator 21 on, in order to feed brake pressure into the applicable wheel brake cylinder and synchronize the rpm of the driven wheels.

The pressure generator unit 21 has one pressure generator 35 each, associated with the respective wheel brake cylinders 17 and 18. Since the pressure generators 35 are identical in structure and are disposed symmetrically to an axis A—A, the detailed illustration in FIG. 2 and the ensuing description will be limited to the pressure generator connected to the wheel brake lines 16 and 16.1.

The pressure generator 35 has a housing 38 substantially comprising a housing part 36 and a connection head 37 joined to it. The housing part 36 has a cylindrical bore 39, in which a hollow cylinder 40 is fittingly guided longitudinally. The outside of the hollow cylinder 40 is provided with a racklike set of teeth 41 for the engagement of a pinion 42 of a motor drive mechanism 43. On its end remote from the connection head 37, the bore 39 of the housing part 36 is defined by an introduced stop sleeve 46 that is retained by a snap ring 44 and closed by a cap 45.

A piston 50, embodied as a rod piston, of the pressure generator 35 is disposed substantially inside the hollow cylinder 40. On its end 51 to the left in the drawing, the piston 50 is equipped with a tang 52, which extends with radial play through a bore 53 in a bottom 54 of the hollow cylinder 40. To absorb axial forces, the piston 50 is retained on the cylinder 40 by a securing ring 55 slipped onto the tang 52.

Also located in the bore 39 of the housing part 36 is a cylinder 60 cooperating with the piston 50. A formed-on flange 61 retains this cylinder between the housing part 36 and the connection head 37 of the pressure generator housing 38. The cylinder 60, which like the hollow cylinder 40 and the piston 50 extends coaxially with the bore 39, has a bottom 62 with a bore 63, which receives a lip seal 64 and is penetrated in a fluid-tight manner by the piston 50.

With its end portion 65 on the right of the flange 61, the cylinder 60 engages the inside of a chamber 67 formed by a bore 66 of the connection head 37. Connected to this chamber are a line connection 68, leading via the wheel brake line 16 to the master brake cylinder 11 of the vehicle brake system 10, and a line connection 69, leading through the wheel brake line 16.1 to the wheel brake cylinder 18. A seat valve 72, having a valve seat 73 formed by the connection head 37 and a closing element 74 actuatable by the piston 50, is located in the chamber 67 of the connection head 37. By means of the seat valve 72, the interior of the cylinder 60 is connected to the pressure course between the master brake cylinder 11 and the wheel brake cylinder 18.

An actuating member 78, embodied as a tube, for the seat valve 72 is located inside the cylinder 60. The actuating member 78 has a plate 79 embodied as a square, toward the valve, and the valve closing member 74 is secured to this plate. The side of the plate 79 remote from the valve is engaged by a helical compression spring 80, which is disposed coaxially with the actuating member 78 and is supported on the cylinder 60. Toward the valve, the actuating member 78 is also provided with openings 81. On its end remote from the valve 72 the actuating member 78, which is coaxially received by the cylinder 60, is provided with an inwardly oriented collar 82, through which the piston 50 extends with its end portion 83 toward the cylinder. Inside the actuating member 78, the piston 50 carries a snap ring 84 for engagement with the collar 82 for a formfitting engagement.

Figure 2:
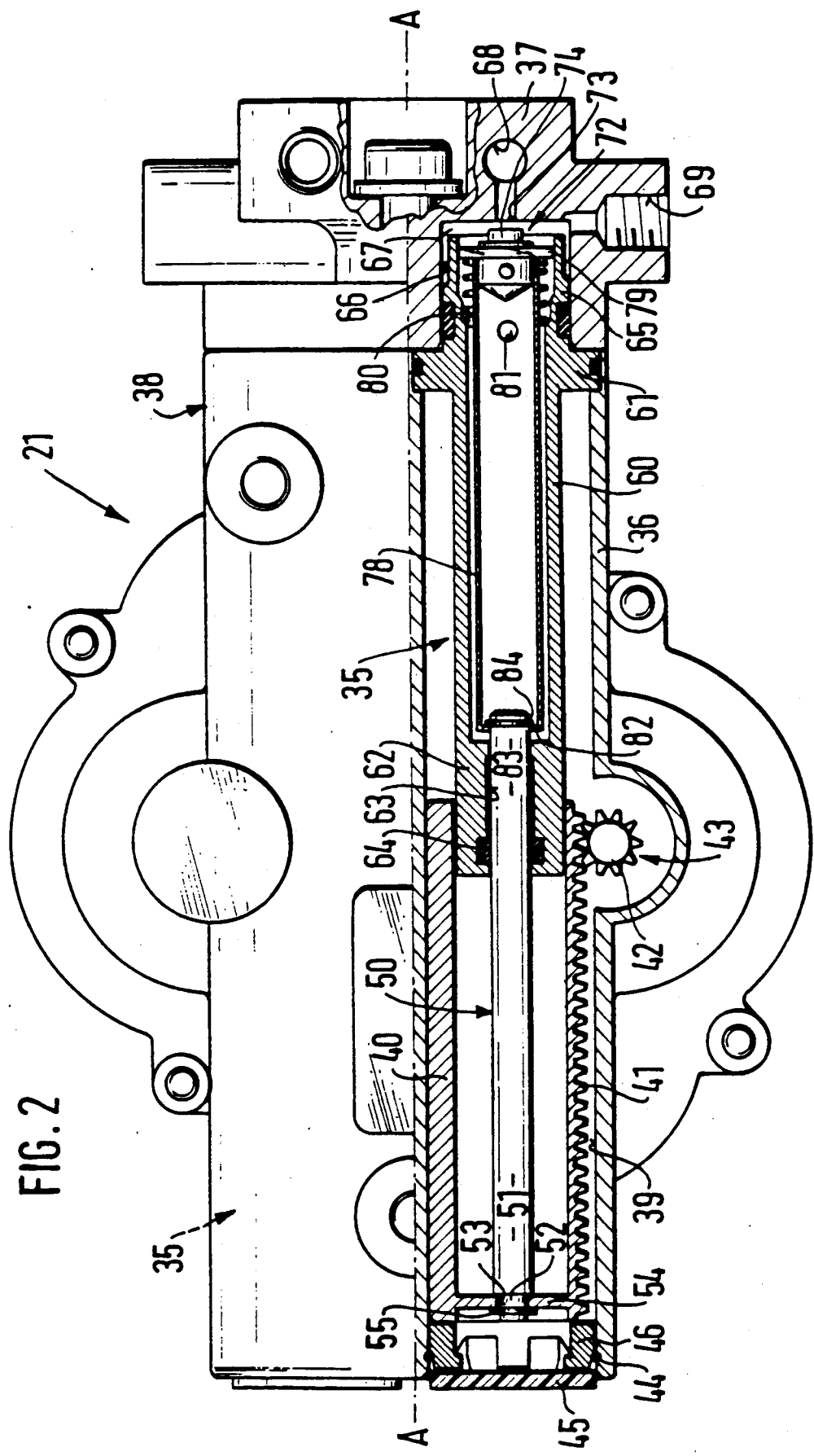
FIG. 2 is a longitudinal section through a pressure generator of the unit on a larger scale than in FIG. 1.

In the outset position shown in FIG. 2 of the piston 50, which is enveloped over virtually its entire length by the hollow cylinder 40, the seat valve 72 is opened by the engagement of the piston with the actuating member 78. A brake pressure produced by the driver therefore becomes operative in the wheel brake cylinder 18. In this outset position, the hydraulic unit 14 can also affect the brake pressure in the wheel brake cylinder 18, for the sake of anti-skid braking. Contrarily, if drive slip, i.e., a loss of traction, appears at the vehicle wheel associated with the wheel brake 20, the control unit 29 turns on the drive 43 of the pressure generator 35. The pinion 42 now displaces the hollow cylinder 40 and piston 50 toward the connection head 37.

In this process the actuating member 78 follows the motion of the piston 50, under the influence of the helical compression spring 80, so that the seat valve 72 closes the pressure course to the master brake cylinder 11. As the piston motion continues, brake fluid located in the cylinder 60, actuating member 78 and chamber 67 is expelled through the line connection 69, and brake pressure is built up in the wheel brake cylinder 18. The piston motion is terminated once synchronous rotation of the driven vehicle wheels is attained. At the end of the acceleration event, the piston 50 is returned to its outset position, in which it opens the seat valve 72 by engagement of the snap ring 84 with the collar 82 of the actuating member 78.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A pressure generator unit (21) for a hydraulic brake system (10) of a vehicle having brakes (19, 20, 27, 28) for driven and non-driven wheels, said pressure generator unit including a housing (38), at least one pressure generator (35) for traction control of at least one driven wheel, said at least one pressure generator (35), includes a housing part (36), a cylinder bore (39) in said housing part, a driven piston (50) in said cylinder bore, a cylinder (60) in said cylinder bore provided for reception and expulsion of brake fluid by means of said driven piston (50), into the brake of one driven wheel, a connection head (37) secured relative to said cylinder (60), a valve (72) arranged at one end of said cylinder (60) and relative to a valve seat (73) on said connection head (37), said valve (72) is actuated as a function of a motion of the piston (50), to control a pressure course between a master brake cylinder (11) and a wheel brake cylinder (18), said piston (50) is embodied as a rod piston and includes a first end (51) that protrudes out of said cylinder (60), said first end (51) of said piston (50) is connected with radial play with one end of a coaxially extending hollow cylinder (40) which at least partly envelops said piston and said cylinder (60), and said hollow cylinder (40) is longitudinally guided relative to said cylinder (60) and is provided on an outside surface with racklike set of teeth (41) for engagement with a motor drive mechanism (43) for operation of said piston (50) thereby controlling retraction of at least one wheel for limiting wheel drive slip.

2. A pressure generator unit as defined by claim 1, in which said cylinder (60) is secured, with one end portion (65) located outside a region enveloped by said hollow cylinder (40), relative to said housing (38), and the piston (50) is supported with radial play on a free end of said hollow cylinder (40).

3. A pressure generator unit as defined by claim 1, in which said piston (50) includes a tang (52) extends through a bottom (54) of said hollow cylinder (40) and is axially retained on the free end of said hollow cylinder with a securing ring (55).

4. A pressure generator unit as defined by claim 2, in which said piston (50) includes a tang (52) extends through a bottom (54) of said hollow cylinder (40) and is axially retained on the free end of said hollow cylinder with a securing ring (55).

5. A pressure generator unit as defined by claim 1, which includes an actuating member (78), said piston (50) includes a second end portion (83) toward the cylinder (60) and the piston (50) in its outset position has a formfitting engagement with said actuating member (78) which axially penetrates the cylinder (60), said valve (72) includes a closing element (74) which is connected to said actuating member (78) which can be lifted from said valve seat (73) toward the housing counter to a spring force of a spring (80).

6. A pressure generator unit as defined by claim 5, in which said piston (50) engages one end of said actuating member (78) which is embodied as a tube, and said actuating member is guided longitudinally displaceably in the said cylinder (60) and on its valve end has a plate (79) supporting the valve closing element (74).

7. A pressure generator unit as defined by claim 1, which includes two pressure generators, one for controlling fluid flow to each of said driven wheels.

* * * * *